US006218323B1

(12) United States Patent
Bretschneider et al.

(10) Patent No.: US 6,218,323 B1
(45) Date of Patent: Apr. 17, 2001

(54) SODA-LIME-SILICATE GLASS COMPOSITION

(75) Inventors: Joachim Bretschneider, Weiden; Hubert Drexler, Amberg, both of (DE)

(73) Assignee: Flachglas Aktiengesellschaft, Fuerth (DE)

( * ) Notice: Subject to any disclaimer, the term of this patent is extended or adjusted under 35 U.S.C. 154(b) by 0 days.

(21) Appl. No.: 09/373,392

(22) Filed: Aug. 12, 1999

(30) Foreign Application Priority Data

Oct. 30, 1998 (DE) .......................................... 298 19 347 U

(51) Int. Cl.$^7$ ..................................................... C03C 3/087
(52) U.S. Cl. ................................................. 501/71; 501/70
(58) Field of Search ......................................... 501/71, 70

(56) References Cited

U.S. PATENT DOCUMENTS

| | | | |
|---|---|---|---|
| 5,030,593 | * 7/1991 | Heithoff | 501/72 |
| 5,030,594 | * 7/1991 | Heithoff | 501/72 |
| 5,346,768 | * 9/1994 | Winter et al. | 501/71 |
| 5,558,942 | * 9/1996 | Itoh et al. | 501/71 |
| 5,656,559 | * 8/1997 | Combes et al. | 501/70 |

FOREIGN PATENT DOCUMENTS

0463606 * 2/1992 (EP) .
0463607 * 2/1992 (EP) .

* cited by examiner

Primary Examiner—Karl Group
(74) Attorney, Agent, or Firm—Marshall & Melhorn, LLC

(57) ABSTRACT

A neutral-colored soda-lime-silicate glass with high light transmission in the visible region. The glass has a basic composition which contains at least the following constituents: $SiO_2$, 66–75 weight %; $Na_2O$, 10–20 weight %; CaO, 5–15 weight %; MgO, 0–6 weight %; $Al_2O_3$, 0–5 weight %; and $K_2O$, 0–5 weight %; and incorporates a colorant portion comprising the following constituents: Co, 0.1–1 ppm; $Fe_2O_3$, $\leq 0.03$ weight % (total iron content); and $FeO/Fe_2O_3$, >0.4. The glass possesses a light transmittance (illuminant D 65 according to DIN 67 507) of at least 89% at a reference thickness of 4 mm.

7 Claims, No Drawings

SODA-LIME-SILICATE GLASS COMPOSITION

BACKGROUND OF THE INVENTION

1. Field of the Invention

The invention relates to a neutral-colored soda-lime-silicate glass with a basic glass composition of 66–75 weight % $SiO_2$, 10–20 weight % $Na_2O$, 5–15 weight % CaO, 0–5 weight % MgO, 0–5 weight % $Al_2O_3$, 0–5 weight % $K_2O$, as well as colorants $Fe_2O_3$ (total iron content) and cobalt.

Neutral-colored in connection with the invention means that the glass does not have any significant coloration in respect of transmission, and thus can be termed clear transparent. In technical circles, such glass is termed low-iron or white glass.

2. Description of the Prior Art

It is a known phenomenon that with such neutral-colored, that is to say, clear transparent, glass in respect of transmission, the edges of the glass sheets produced from it appear nevertheless to be colored. Thus, one observes with such glass, irrespective of the sheet thickness, a more or less intense green tinge of the glass edges, which is attributable to practically unavoidable impurities, such as the presence of iron particles, in the raw materials used. Even if colored glass edges are acceptable for most of the applications of the glasses, there are frequently aesthetic problems with the green hue, particularly when the glass is arranged directly adjacent to objects of different colors, for example in articles of furniture, or when the glass sheets, such as for example table tops with visible glass edges, are arranged such that their edges are in the direct field of view of the observer.

For formation of glass edges appearing azure, EP 0 463 607 B1 suggests, in addition to minimizing the iron content in the glass to less than 0.02 weight % $Fe_2O_3$ (total iron content), that the redox ratio, that is to say the ratio of the iron present in bivalent state (FeO, expressed as $Fe_2O_3$) to the total iron content (expressed as $Fe_2O_3$) should be adjusted to at least 0.44. The high content of bivalent iron has the effect that the glass edges assume an azure tinge, the transparency of this glass remaining of course unaffected thereby.

In conventional flat glass furnaces and under the melting conditions generally customary for the production of sulfate-refined soda-lime-silicate glass, it is not possible to achieve such high redox ratios. The redox ratios achievable with such melting systems without special measures are in the range of between 0.15 and 0.35. Higher redox ratios can only be achieved in conventional glass furnaces by using special, very costly additional glass raw materials and with suitable modification of the melting process. Another, equally costly option is the use of special glass furnaces.

In addition, work has been carried out with other colorant additives in order to obtain the most widely varying range of tints of the edges of a glass sheet. Thus, EP 0 463 606 B1 teaches, with low iron content of less than 0.02 weight % $Fe_2O_3$ (total iron content), that selenium be added in the amount of $3 \cdot 10^{-5}$ weight % to $2 \cdot 10^{-4}$ weight % in order to obtain honey or wood-colored edges of a glass sheet. For the purpose of tinting, cobalt in the form of cobalt oxide (CoO) is added if necessary, that is to say in the maximum amount of $3 \cdot 10^{-4}$ weight %. For production of the glass described in EP 0 463 606 B1, a special glass furnace is recommended.

SUMMARY OF THE INVENTION

It is the object of the invention, in the case of a neutral-colored soda-lime-silicate glass with high light transmittance to achieve the effect that the glass edges appear aesthetically pleasing, that is to say, essentially neutral-colored to faintly blue, the glass being producible simply with conventional melting processes.

According to the invention, provision is made for the glass to consist of a glass basic composition which contains at least the following constituents:

| | |
|---|---|
| $SiO_2$ | 66–75 weight % |
| $Na_2O$ | 10–20 weight % |
| CaO | 5–15 weight % |
| MgO | 0–6 weight % |
| $Al_2O_3$ | 0–5 weight % |
| $K_2O$ | 0–5 weight % | the glass incorporating a colorant content which consists of the following constituents:

| | |
|---|---|
| CoO | 0.1–1 ppm |
| $Fe_2O_3$ | ≦0.03 weight % (total iron content) |
| $FeO/Fe_2O_3$ | <0.4 | where the proportions of all constituents total 100 weight % and where the glass possesses a light transmittance (illuminant D 65 according to DIN 67 507) of at least 89% with a reference thickness of 4 mm.

DESCRIPTION OF THE PREFERRED EMBODIMENTS

A preferred glass composition consists of a glass basic composition which contains at least the following constituents:

| | |
|---|---|
| $SiO_2$ | 66–75 weight % |
| $Na_2O$ | 10–20 weight % |
| CaO | 5–15 weight % |
| MgO | 0–5 weight % |
| $Al_2O_3$ | 0–5 weight % |
| $K_2O$ | 0–5 weight % | where the glass incorporates a colorant content which comprises the following constituents:

| | |
|---|---|
| CoO | 0.1–1 ppm |
| $Fe_2O_3$ | ≦0.03 weight % (total iron content) |
| $FeO/Fe_2O_3$ | <0.4 | where the proportions of all constituents total 100 weight % and where the glass possesses a light transmittance (illuminant D 65 according to DIN 67 507) of at least 89% with a reference thickness of 4 mm.

An alternatively preferred composition consists of a glass basic composition which contains at least the following constituents:

| | |
|---|---|
| $SiO_2$ | 70–74 weight % |
| $Na_2O$ | 12–15 weight % |
| CaO | 7–10 weight % |
| MgO | 3–6 weight % |

-continued

| | | |
|---|---|---|
| $Al_2O_3$ | 0.1–2 | weight % |
| $K_2O$ | 0.1–1 | weight % | where the glass incorporates a coloring content which comprises the following constituents:

| | |
|---|---|
| CoO | 0.1–0.5 ppm |
| $Fe_2O_3$ | 0.01–0.02 weight % (total iron) |
| $FeO/Fe_2O_3$ | 0.20–0.38 | where the proportions of all constituents total 100 weight % and where the glass possesses a light transmittance (illuminant D 65 according to DIN 67 507) of at least 91% with a reference thickness of 4 mm.

The addition of cobalt to glass compositions with the aim of imparting a blue tinge in respect of transmission to the glass produced from them, is in itself known. According to the prior art, it is unavoidable for the transparency of the glass to decrease on account of the absorption caused by the colorant to a greater or lesser degree in comparison with a glass composition free from colorant. In the case of the glass produced with the glass composition according to the invention, its transparency is almost completely retained however, in spite of the use of cobalt. A perceptible color change results, as desired, solely at the glass edges, where as a result of the extremely small quantity of added cobalt, only the color coordinate b* in the color coordinate system (L*.a*.b*) is shifted approximately 0.1 from yellow towards blue.

A redox ratio in the region of 0.25 to 0.35 is preferable; approximately 0.3 is more preferable.

The glass composition according to the invention preferably contains the colorant component cobalt (CoO) in an amount of less than 0.5 ppm; approximately 0.3 ppm is more preferable.

The proportion of colorant includes the essential proportion of colorants, but it should not be excluded that other colorants may be present, at least in traces.

The production of glass with the glass composition according to the invention will take place preferably by the float process. Of course, the glass composition can also be processed employing other flat glass processes, for example the casting process.

The invention is based on the surprising principle that it succeeds in obtaining a glass composition processable in a conventional furnace, based on soda-lime-silicate glass, with neutral or blue-lightly colored edges of the glass sheets produced therefrom by working with an extremely small addition of cobalt (CoO) to a low-iron glass composition. The redox conditions necessary for melting are the same as those which can be readily adjusted in the production of soda-lime-silicate glass in conventional glass furnaces.

The invention demonstrates that in the production of low-iron glass with high light transmission, it is altogether possible to work with glass compositions according to the invention with the addition of cobalt, even when glass is to be produced, for example for use in solar energy plants, where the coloring of the edges is less important. This saves expense for the remelting phases.

The invention will be described in detail below with the aid of an example.

EXAMPLE

| | | |
|---|---|---|
| $SiO_2$ | 72.5 | weight % |
| $Na_2O$ | 13.0 | weight % |
| CaO | 8.8 | weight % |
| MgO | 4.3 | weight % |
| $Al_2O_3$ | 0.6 | weight % |
| $K_2O$ | 0.4 | weight % |
| $SO_3$ | 0.3 | weight % |
| $Fe_2O_3$ | 0.02 | weight % (total iron content) |
| $FeO/Fe_2O_3$ | 0.3 | |

In addition, BaO and $TiO_2$ were present to the extent usual for such types of glass. 0.3 ppm of cobalt in the form of cobalt oxide (CoO) was added. The glass was melted in a conventional glass furnace and refined by means of sodium sulfate. The 4 mm thick glass sheets produced subsequently in a float bath evidenced no significant changes in their photometric values as compared with those without addition of cobalt. On the other hand, the edges possessed, as desired, a pale blue tinge.

| The following optical data were determined | |
|---|---|
| Light transmittance ($T_L$) for illuminant D 65 according to DIN 67 507 | 91.1% |
| Solar direct transmittance ($T_E$) according to DIN 67 507 | 89.2% |
| General color rendering index ($R_a$) according to DIN 6169, Part 1 | 99.7 |
| Color coordinate a* (illuminant D 65, 2 ° standard observer) according to DIN 6174 | −0.29 |
| Color coordinate b* (illuminant D 65, 2 ° standard observer) according to DIN 6174 | 0.11 |

The features disclosed in the foregoing description and/or in the claims may, both separately and in any combination thereof, be material for realizing the invention in diverse forms thereof.

What is claimed is:

1. Neutral-colored soda-lime-silicate glass having a basic glass composition which contains at least the following constituents:

| | |
|---|---|
| $SiO_2$ | 66–75 weight % |
| $Na_2O$ | 10–20 weight % |
| CaO | 5–15 weight % |
| MgO | 0–6 weight % |
| $Al_2O_3$ | 0–5 weight % |
| $K_2O$ | 0–5 weight % | where the glass incorporates a colorant content comprising the following constituents:

| | |
|---|---|
| CoO | 0.1–1 ppm |
| Fe$_2$O$_3$ | ≦0.03 weight % (total iron content) |
| FeO/Fe$_2$O$_3$ | <0.4 | and where the glass possesses a light transmittance (illuminant D 65 according to DIN 67 507) of at least 89% with a reference thickness of 4 mm.

2. A neutral-colored soda-lime-silicate glass with a basic composition which contains at least the following constituents:

| | |
|---|---|
| SiO$_2$ | 70–74 weight % |
| Na$_2$O | 12–15 weight % |
| CaO | 7–10 weight % |
| MgO | 3–6 weight % |
| Al$_2$O$_3$ | 0.1–2 weight % |
| K$_2$O | 0.1–1 weight % | where the glass incorporates a colorant content consisting essentially of the following constituents:

| | |
|---|---|
| CoO | 0.1–0.5 ppm |
| Fe$_2$O$_3$ | 0.01–0.02 weight % (total iron) |
| FeO/Fe$_2$O$_3$ | 0.20–0.38 | and where the glass possesses a light transmittance (illuminant D 65 according to DIN 67 507) of at least 91% with a reference thickness of 4 mm.

3. The soda-lime-silicate glass of claim 1 wherein the ratio of FeO/Fe$_2$O$_3$ is in the range of 0.25–0.35.

4. The soda-lime-silicate glass of claim 1 wherein the content of the colorant CoO is less than 0.5 ppm.

5. The soda-lime-silicate glass of claim 1 wherein said soda-lime-silicate glass is produced by the float process.

6. The soda-lime-silicate glass of claim 1 wherein the ratio of FeO/Fe$_2$O$_3$ is about 0.3.

7. The soda-lime-silicate glass of claim 1 wherein the content of the colorant CoO is less than about 0.3 ppm.

* * * * *